United States Patent
Brown et al.

(10) Patent No.: US 8,028,092 B2
(45) Date of Patent: Sep. 27, 2011

(54) INSERTING ADVERTISING CONTENT

(75) Inventors: Scott K. Brown, Sterling, VA (US); Bradley Paul Gorman, Ashburn, VA (US); Brooke Lamont Patterson, Ashburn, VA (US); Mark Lionel Filteau, Alexandria, VA (US); Kevin Eugene Mason, Ashburn, VA (US); Eric Adam Manchester, Rockville, MD (US)

(73) Assignee: AOL Inc., Dulles, VA (US)

( * ) Notice: Subject to any disclaimer, the term of this patent is extended or adjusted under 35 U.S.C. 154(b) by 1869 days.

(21) Appl. No.: 10/183,420

(22) Filed: Jun. 28, 2002

(65) Prior Publication Data

US 2004/0003118 A1    Jan. 1, 2004

(51) Int. Cl.
*G06F 15/16* (2006.01)
*H04N 7/10* (2006.01)

(52) U.S. Cl. ............... 709/246; 709/217; 725/32

(58) Field of Classification Search .......... None
See application file for complete search history.

(56) References Cited

U.S. PATENT DOCUMENTS

| | | | |
|---|---|---|---|
| 4,872,160 A | 10/1989 | Hemmady et al. | |
| 5,014,125 A | 5/1991 | Pocock et al. | |
| 5,283,639 A | 2/1994 | Esch et al. | |
| 5,493,568 A | 2/1996 | Sampat et al. | |
| 5,543,856 A * | 8/1996 | Rosser et al. | 725/32 |
| 5,583,561 A | 12/1996 | Baker et al. | |
| 5,600,364 A * | 2/1997 | Hendricks et al. | 725/9 |
| 5,600,646 A | 2/1997 | Polomski | |
| 5,604,542 A | 2/1997 | Dedrick | |
| 5,608,446 A | 3/1997 | Carr et al. | |
| 5,646,675 A | 7/1997 | Copriviza et al. | |
| 5,689,641 A | 11/1997 | Ludwig et al. | |
| 5,742,597 A | 4/1998 | Holt et al. | |
| 5,774,660 A | 6/1998 | Brendel et al. | |
| 5,778,187 A * | 7/1998 | Monteiro et al. | 709/231 |
| 5,799,002 A | 8/1998 | Krishnan | |
| 5,802,301 A | 9/1998 | Dan et al. | |
| 5,809,237 A | 9/1998 | Watts et al. | |
| 5,815,662 A | 9/1998 | Ong | |
| 5,819,036 A | 10/1998 | Adams et al. | |
| 5,838,912 A | 11/1998 | Poon et al. | |
| 5,841,763 A | 11/1998 | Leondires et al. | |
| 5,867,502 A | 2/1999 | Chang | |
| 5,872,588 A | 2/1999 | Aras et al. | |
| 5,889,950 A * | 3/1999 | Kuzma | 709/219 |

(Continued)

FOREIGN PATENT DOCUMENTS

EP    1 063 814    12/2000

(Continued)

OTHER PUBLICATIONS

Chickering, David Maxwell et al. "Targeted advertising with inventory management." Proceedings of the 2nd ACM conference on Electronic Commerce. Minneapolis, 2000. pp. 145-149. ACM Press.*

(Continued)

*Primary Examiner* — Jeffrey R Swearingen
(74) *Attorney, Agent, or Firm* — Finnegan, Henderson, Farabow, Garrett & Dunner, LLP (57) ABSTRACT

Content may be inserted at a duplicating device by inserting advertising content into a duplicated feed, and transmitting the duplicated feed to the terminal. The transmission of the duplicated feed is performed in response to a state of the terminal.

38 Claims, 5 Drawing Sheets

U.S. PATENT DOCUMENTS

| | | | |
|---|---|---|---|
| 5,913,062 A | 6/1999 | Vrvilo et al. | |
| 5,917,830 A | 6/1999 | Chen et al. | |
| 5,920,700 A | 7/1999 | Gordon et al. | |
| 5,935,245 A | 8/1999 | Sherer | |
| 5,946,614 A | 8/1999 | Robbins et al. | |
| 5,961,603 A * | 10/1999 | Kunkel et al. | 709/229 |
| 5,973,722 A | 10/1999 | Wakai et al. | |
| 5,983,005 A | 11/1999 | Monteiro et al. | |
| 5,995,943 A * | 11/1999 | Bull et al. | 709/217 |
| 6,006,265 A * | 12/1999 | Rangan et al. | 709/226 |
| 6,011,782 A | 1/2000 | DiSimone et al. | |
| 6,034,746 A * | 3/2000 | Desai et al. | 375/240.26 |
| 6,052,805 A | 4/2000 | Chen et al. | |
| 6,061,349 A | 5/2000 | Coile et al. | |
| 6,064,376 A * | 5/2000 | Berezowski et al. | 725/42 |
| 6,097,720 A | 8/2000 | Araujo et al. | |
| 6,101,187 A | 8/2000 | Cukier et al. | |
| 6,119,163 A | 9/2000 | Monteiro et al. | |
| 6,141,336 A | 10/2000 | Bauchot et al. | |
| 6,151,621 A | 11/2000 | Colyer et al. | |
| 6,151,632 A | 11/2000 | Chaddha et al. | |
| 6,157,635 A | 12/2000 | Wang et al. | |
| 6,173,314 B1 | 1/2001 | Kurashima et al. | |
| 6,189,039 B1 | 2/2001 | Harvey et al. | |
| 6,195,680 B1 | 2/2001 | Goldszmidt et al. | |
| 6,201,859 B1 | 3/2001 | Memhard et al. | |
| 6,208,975 B1 * | 3/2001 | Bull et al. | 705/14 |
| 6,216,129 B1 * | 4/2001 | Eldering | 707/4 |
| 6,226,686 B1 | 5/2001 | Rothschild et al. | |
| 6,253,238 B1 | 6/2001 | Lauder et al. | |
| 6,259,701 B1 | 7/2001 | Shur et al. | |
| 6,266,335 B1 | 7/2001 | Bhaskaran | |
| 6,298,088 B1 | 10/2001 | Bhatt et al. | |
| 6,298,089 B1 | 10/2001 | Gazit | |
| 6,298,129 B1 | 10/2001 | Culver et al. | |
| 6,308,327 B1 * | 10/2001 | Liu et al. | 725/37 |
| 6,314,451 B1 * | 11/2001 | Landsman et al. | 709/217 |
| 6,314,464 B1 | 11/2001 | Murata et al. | |
| 6,327,622 B1 | 12/2001 | Jindal et al. | |
| 6,339,761 B1 * | 1/2002 | Cottingham | 705/14 |
| 6,347,090 B1 | 2/2002 | Ooms et al. | |
| 6,357,042 B2 * | 3/2002 | Srinivasan et al. | 725/32 |
| 6,360,195 B1 * | 3/2002 | Liao et al. | 703/28 |
| 6,363,075 B1 | 3/2002 | Huang et al. | |
| 6,363,429 B1 | 3/2002 | Ketcham | |
| 6,370,112 B1 | 4/2002 | Voelker | |
| 6,377,996 B1 | 4/2002 | Lumelsky et al. | |
| 6,381,746 B1 | 4/2002 | Urry | |
| 6,389,462 B1 | 5/2002 | Cohen et al. | |
| 6,404,745 B1 | 6/2002 | O'Neil et al. | |
| 6,411,773 B1 | 6/2002 | De Vos et al. | |
| 6,415,312 B1 | 7/2002 | Boivie | |
| 6,415,323 B1 | 7/2002 | McCanne et al. | |
| 6,418,214 B1 | 7/2002 | Smythe et al. | |
| 6,434,622 B1 | 8/2002 | Monteiro et al. | |
| 6,437,830 B1 | 8/2002 | Horlander | |
| 6,457,043 B1 | 9/2002 | Kwak et al. | |
| 6,466,550 B1 | 10/2002 | Foster et al. | |
| 6,490,285 B2 | 12/2002 | Lee et al. | |
| 6,493,872 B1 * | 12/2002 | Rangan et al. | 370/503 |
| 6,505,169 B1 * | 1/2003 | Bhagavath et al. | 705/14.66 |
| 6,510,553 B1 | 1/2003 | Hazra | |
| 6,516,350 B1 | 2/2003 | Lumelsky et al. | |
| 6,526,426 B1 * | 2/2003 | Lakritz | 715/536 |
| 6,564,003 B2 * | 5/2003 | Marko et al. | 386/69 |
| 6,564,380 B1 | 5/2003 | Murphy | |
| 6,587,138 B1 * | 7/2003 | Vogt et al. | 348/14.12 |
| 6,615,039 B1 * | 9/2003 | Eldering | 725/42 |
| 6,622,174 B1 * | 9/2003 | Ukita et al. | 709/246 |
| 6,625,773 B1 | 9/2003 | Boivie et al. | |
| 6,646,997 B1 | 11/2003 | Baxley et al. | |
| 6,665,726 B1 | 12/2003 | Leighton et al. | |
| 6,684,249 B1 * | 1/2004 | Frerichs et al. | 709/225 |
| 6,698,020 B1 * | 2/2004 | Zigmond et al. | 725/34 |
| 6,704,930 B1 * | 3/2004 | Eldering et al. | 725/36 |
| 6,708,213 B1 | 3/2004 | Bommaiah et al. | |
| 6,711,212 B1 | 3/2004 | Lin | |
| 6,718,551 B1 * | 4/2004 | Swix et al. | 725/32 |
| 6,728,356 B1 | 4/2004 | Carroll | |
| 6,728,784 B1 | 4/2004 | Mattaway | |
| 6,738,978 B1 * | 5/2004 | Hendricks et al. | 725/35 |
| 6,751,219 B1 | 6/2004 | Lipp et al. | |
| 6,785,704 B1 | 8/2004 | Mcanne | |
| 6,826,185 B1 | 11/2004 | Montanaro et al. | |
| 6,847,618 B2 | 1/2005 | Laursen et al. | |
| 6,850,707 B1 | 2/2005 | Chang et al. | |
| 6,856,967 B1 * | 2/2005 | Woolston et al. | 705/26 |
| 6,873,627 B1 | 3/2005 | Miller et al. | |
| 6,879,565 B2 | 4/2005 | Baxley et al. | |
| 6,978,470 B2 * | 12/2005 | Swix et al. | 725/32 |
| 6,993,081 B1 * | 1/2006 | Brunheroto et al. | 370/487 |
| 6,996,102 B2 | 2/2006 | Pegrum et al. | |
| 7,039,932 B2 * | 5/2006 | Eldering | 725/35 |
| 7,062,510 B1 * | 6/2006 | Eldering | 707/104.1 |
| 7,089,577 B1 | 8/2006 | Rakib et al. | |
| 7,100,183 B2 * | 8/2006 | Kunkel et al. | 725/34 |
| 7,133,922 B1 | 11/2006 | She et al. | |
| 7,142,509 B1 | 11/2006 | Rovner et al. | |
| 7,203,758 B2 * | 4/2007 | Cook et al. | 709/231 |
| 7,237,033 B2 | 6/2007 | Weigand et al. | |
| 7,266,609 B2 | 9/2007 | Bill et al. | |
| 7,292,571 B2 | 11/2007 | Brown | |
| 7,394,850 B1 * | 7/2008 | Gordon | 375/240.01 |
| 7,500,258 B1 * | 3/2009 | Eldering | 725/32 |
| 7,711,791 B2 * | 5/2010 | DuVall et al. | 709/217 |
| 7,895,076 B2 * | 2/2011 | Kutaragi et al. | 705/14.41 |
| 2001/0049620 A1 * | 12/2001 | Blasko | 705/10 |
| 2002/0019984 A1 | 2/2002 | Rakib | |
| 2002/0024956 A1 | 2/2002 | Keller-Tuberg | |
| 2002/0026482 A1 | 2/2002 | Morishige et al. | |
| 2002/0031126 A1 | 3/2002 | Crichton et al. | |
| 2002/0040404 A1 * | 4/2002 | Lahr | 709/231 |
| 2002/0082914 A1 * | 6/2002 | Beyda et al. | 705/14 |
| 2002/0093963 A1 | 7/2002 | Roullet et al. | |
| 2002/0103864 A1 | 8/2002 | Rodman et al. | |
| 2002/0112004 A1 | 8/2002 | Reid et al. | |
| 2002/0112069 A1 | 8/2002 | Sim | |
| 2002/0114302 A1 | 8/2002 | McDonald et al. | |
| 2002/0116532 A1 | 8/2002 | Berg | |
| 2002/0126685 A1 | 9/2002 | Leatherbury et al. | |
| 2002/0161847 A1 | 10/2002 | Weigand et al. | |
| 2002/0161910 A1 | 10/2002 | Bill et al. | |
| 2002/0172508 A1 | 11/2002 | Zennou | |
| 2002/0191950 A1 | 12/2002 | Wang | |
| 2003/0018966 A1 * | 1/2003 | Cook et al. | 725/2 |
| 2003/0018968 A1 * | 1/2003 | Avnet | 725/32 |
| 2003/0061278 A1 | 3/2003 | Agarwalla et al. | |
| 2003/0099202 A1 | 5/2003 | Lear et al. | |
| 2003/0126197 A1 | 7/2003 | Black et al. | |
| 2003/0145038 A1 | 7/2003 | Bin Tariq et al. | |
| 2003/0154283 A1 | 8/2003 | Brown | |
| 2003/0188308 A1 * | 10/2003 | Kizuka | 725/32 |
| 2004/0025186 A1 | 2/2004 | Jennings et al. | |
| 2004/0205829 A1 * | 10/2004 | Hane, III. | 725/135 |
| 2005/0010653 A1 | 1/2005 | McCanne | |
| 2005/0015796 A1 * | 1/2005 | Bruckner et al. | 725/32 |
| 2006/0248231 A1 | 11/2006 | O'Rourke et al. | |
| 2007/0288639 A1 | 12/2007 | Brown | |
| 2009/0150937 A1 | 6/2009 | Ellis et al. | |

FOREIGN PATENT DOCUMENTS

| | | | |
|---|---|---|---|
| EP | 1071287 A2 * | 1/2001 | |
| EP | 1220542 A1 * | 7/2002 | |
| GB | 2 309 849 A | 6/1997 | |
| JP | 08-320800 | 3/1996 | |
| JP | 9270793 | 10/1997 | |
| JP | 11-232201 | 8/1999 | |
| JP | 11-261580 | 9/1999 | |
| JP | 2000-029813 | 1/2000 | |
| JP | 2000-010895 | 2/2000 | |
| JP | 2000244427 A * | 9/2000 | |
| JP | 2001-1508258 | 6/2001 | |
| JP | 2002354449 A * | 12/2002 | |
| JP | 2003111052 A * | 4/2003 | |
| JP | 2003284041 A * | 10/2003 | |
| WO | WO 96/38961 | 12/1996 | |
| WO | WO 98/31107 | 7/1998 | |

| WO | WO 99/27741 | 6/1999 |
| WO | WO 00/28713 | 5/2000 |
| WO | WO 00/65775 | 11/2000 |
| WO | WO 00/65776 | 11/2000 |
| WO | WO 00/69101 | 11/2000 |
| WO | WO 00/69163 | * 11/2000 |

OTHER PUBLICATIONS

Langheinrich, Marc et al. "Unintrusive Customization techniques for Web Advertising". Proceeding of the eighth international conference on World Wide Web. Computer Networks. Amsterdam, Netherlands, 1999. pp. 1259-1272.*

Mobasher, Bamshad et al. "Effective Personalization based on Association Rule Discovery from Web Usage Data." Proceedings of the 3rd International workshop on Web Information and Data Management. Atlanta, 2001. pp. 9-15. ACM Press.*

Nakano, Tadashi et al. "User Adaptive Content Delivery Mechanism on the World Wide Web." Proceedings of the 2002 ACM symposium on Applied Computing. Madrid, Spain. 2002. pp. 1140-1146. ACM Press.*

Datta, Anindya et al. "An Architecture to support scalable online personalization on the web." The VLDB Journal. vol. 10, Issue 1. Aug. 2001. Springer-Verlag New York. pp. 104-117.*

Brassil, Jack et al. "Enhancing Internet Streaming Media with Cueing Protocols." Twentieth Annual Joint Conference of the IEEE Computer and Communications Societies. IEEE Press. 2001. vol. 1. 95-103.*

McGrath, E. "Digital Insertion of Advertising into a Digital Stream." Broadcasting Convention. 1997. 258-61.*

International Search Report, Appln. No. PCT/US03/19774, dated Dec. 18, 2003.

Keller et al., An Active Router Architecture for Multicast Video Distribution, 2000, St. Louis, Missouri, 10 pages.

Lockwood et al., Reprogrammable Network Packet Processing on the Field Programmable Port Extender (FPX), 2001, St. Louis, Missouri, 7 pages.

Taylor et al., Dynamic Hardware Plugins (DHP): Exploiting Reconfigurable Hardware for High-Performance Programmable Routers, 2002, St. Louis, Missouri, 10 pages.

Choi et al., Design of a Flexible Open Platform for High Performance Active Networks, 1999, St. Louis, Missouri, 9 pages.

F. Gong: Multipoint audio and video control for packet-base multimedia conferencing (1994), International (available in file of U.S. Appl. No. 09/893,692), ACM, San Francisco, CA.

S. Miyazaki et al., Stream Transmission Control Application Program Interface, Technical Report of IEICE, vol. 100, No. 672, pp. 341-346; English language abstract included, 1 page, published 2001.

Furht, B., et al., IP Simulcast: A New Technique for Multimedia Broadcasting Over the Internet, Journal of Computing and Information Technology, Zagreb, HR, vol. 6, No. 3, Sep. 1, 1998, pp. 245-254, XP000870379, ISSN: 1330-1136, 10 pages.

ST2 Working Group, L. Degrossi & I. Berger et al., Internet Stream Protocol VCersion 2 (ST2) Protocol Specification—Version ST2; rfc1819.txt, IETF Standard Internet Engineering Task Force, IETC, CH, Aug. 1, 1995, XP015007606, ISSN: 0000-0003, Chapter 1, pp. 6-19, 110 pages.

PCT International Search Report, Apr. 8, 2003, 6 pages, PCT/US02/41769 (available in file of U.S. Appl. No. 09/893,692).

International Search Report, Jul. 2, 2003, PCT/US03/12086 (available in file of U.S. Appl. No. 09/893,692).

International Preliminary Examination Report (IPER), Feb. 24, 2004, PCT/US02/13362 (available in file of U.S. Appl. No. 09/893,692).

International Search Report, Jul. 14, 2003, PCT/US03/12873 (available in file of U.S. Appl. No. 11/565,663).

Supplementary European Search Report, PCT/US0213362, dated Jul. 31, 2006, 6 pages.

Supplemental European Search Report, PCT/US0213363, dated Nov. 24, 2008, 4 pages.

* cited by examiner

INSERTING ADVERTISING CONTENT

CROSS-REFERENCE TO RELATED APPLICATIONS

This application incorporates by reference U.S. Provisional Application No. 60/286,964, titled "Generating Multiple Data Streams from a Single Content source" and filed Apr. 30, 2001; U.S. application Ser. No. 09/893,692, titled "Generating Multiple Data Streams from a Single Content Source" and filed Jun. 29, 2001; U.S. Provisional Application No. 60/373,329, titled "Stream Management" and filed Apr. 18, 2002; U.S. Provisional Application No. 60/343,182, titled "Duplicating Digital Streams for Digital Conferencing Using Switching" and filed Dec. 31, 2001; U.S. application Ser. No. 10/134,552, titled "Managing Access To Streams Hosted on Duplicating Switches" and filed Apr. 30, 2002; U.S. application Ser. No. 10/157,909, titled "Load Balancing with Direct Terminal Response" and filed May 31, 2002; U.S. application Ser. No. 10/134,439, titled "Duplicating Digital Streams for Digital Conferencing Using Switching Technologies" and filed Apr. 30, 2002; and U.S. application Ser. No. 10/090,727, titled "A Duplicating Switch for Streaming Data Units to a Terminal" and filed Mar. 6, 2002.

TECHNICAL FIELD

This document relates to advertising and streaming media systems.

BACKGROUND

Inserting advertising into a media feed may be manually intensive and prone to operator error. One approach to inserting advertising has involved placing special audio tones in an audio/visual signal to cue analog gear to play a stored tape.

SUMMARY

In general, advertising content may be inserted into a media feed by receiving a first feed of one or more data units comprising an attribute portion and a payload portion, duplicating the first feed at the duplicating device for transmission as at least one duplicated feed, inserting advertising content into the duplicated feed prior to transmission, and transmitting the duplicated feed to the terminal. The transmission of the duplicated feed is performed in response to a state of the terminal. A duplicating device may insert the advertising content and perform the other operations.

Implementations may include one or more of the following features. For example, the advertising content may be selected based on a profile for a terminal. The advertising content may be loaded upon determining that the terminal profile relates to an advertising content profile associated with the advertising content. The terminal profile may relate to one or more preferences associated with a user of the terminal. The state of the terminal may include the temporal location of the terminal in receiving the duplicated feed (i.e., the portion of the duplicated feed that the terminal has received).

The first feed may include regularly scheduled programming. The advertising content may be associated with one or more categories. The categories may include a local requirement. The advertising content may include a stream of data units.

The advertising content may be inserted upon reaching a metatag. The metatag may indicate a level of parental control. The duplicating device may be structured and arranged to store the advertising content. Storing the advertising content may include storing the advertising content in an advertising buffer structured and arranged to be transmitted in the duplicated feed upon the occurrence of a predetermined event. The predetermined event may include reaching a metatag in the first feed, the metatag indicating that the advertising content should be inserted in the duplicated feed. Inserting advertising content may include comparing a local metatag with a national metatag to determine whether to insert a piece of local advertising content instead of a piece of national advertising content.

Content may be inserted from the first feed in the event of an interruption. The interruption may include a loss of service in accessing the advertising content. The interruption also may include an emergency message indicating that emergency programming requires transmission.

Transmitting the duplicated feed to the terminal may include transmitting the duplicated feed with an address corresponding to the terminal.

The data unit may include an Internet Protocol packet. The attribute portion of the data unit may include an Internet Protocol header. The attribute portion of the data unit also may specify one or more pieces of layer-three information. Different attribute portions may be generated and associated with duplicates of the payload portion generated in the duplicate stream.

Duplicating at least the payload portion may include duplicating only the payload portion of the data unit. Duplicating at least the payload portion also may include duplicating the payload portion and the attribute portion. Changing the IP destination address may include changing the IP destination address to an IP address corresponding to one or more terminals to which access to the payload portion will be enabled.

Associating different attribute portions with the data unit and duplicates of the payload portion may include specifying destination information that differs among the duplicates of the payload portion. Generating and associating different attribute portions may include changing in IP destination address.

Other features will be apparent from the following description, including the drawings, and the claims.

DESCRIPTION OF DRAWINGS

Like reference symbols in the various drawings indicate like elements.

DETAILED DESCRIPTION

For illustrative purposes, FIGS. 1-5 describe a communications system for inserting advertising content into a stream of data units. Generally, a source system sends a first feed to a duplicating device. In response, the duplicating device duplicates the feed, inserts advertising content in the duplicated feed, and transmits the duplicated feed to a terminal. The transmission of the duplicated feed is performed in response to the state of the terminal receiving the duplicated feed. For instance, a duplicating switch may determine a profile for the terminal (e.g., recipient), and determine where the terminal is at in receiving the stream. Upon determining that the recipient is reaching an advertising 'slot' or metatag, the duplicating device may insert a piece of advertising content into the duplicated stream, and transmit the duplicated stream to the terminal.

For brevity, several elements in the figures described below are represented as monolithic entities. However, as would be understood by one skilled in the art, these elements each may include numerous interconnected computers and components designed to perform a set of specified operations and/or dedicated to a particular geographical region.

Figure 1:
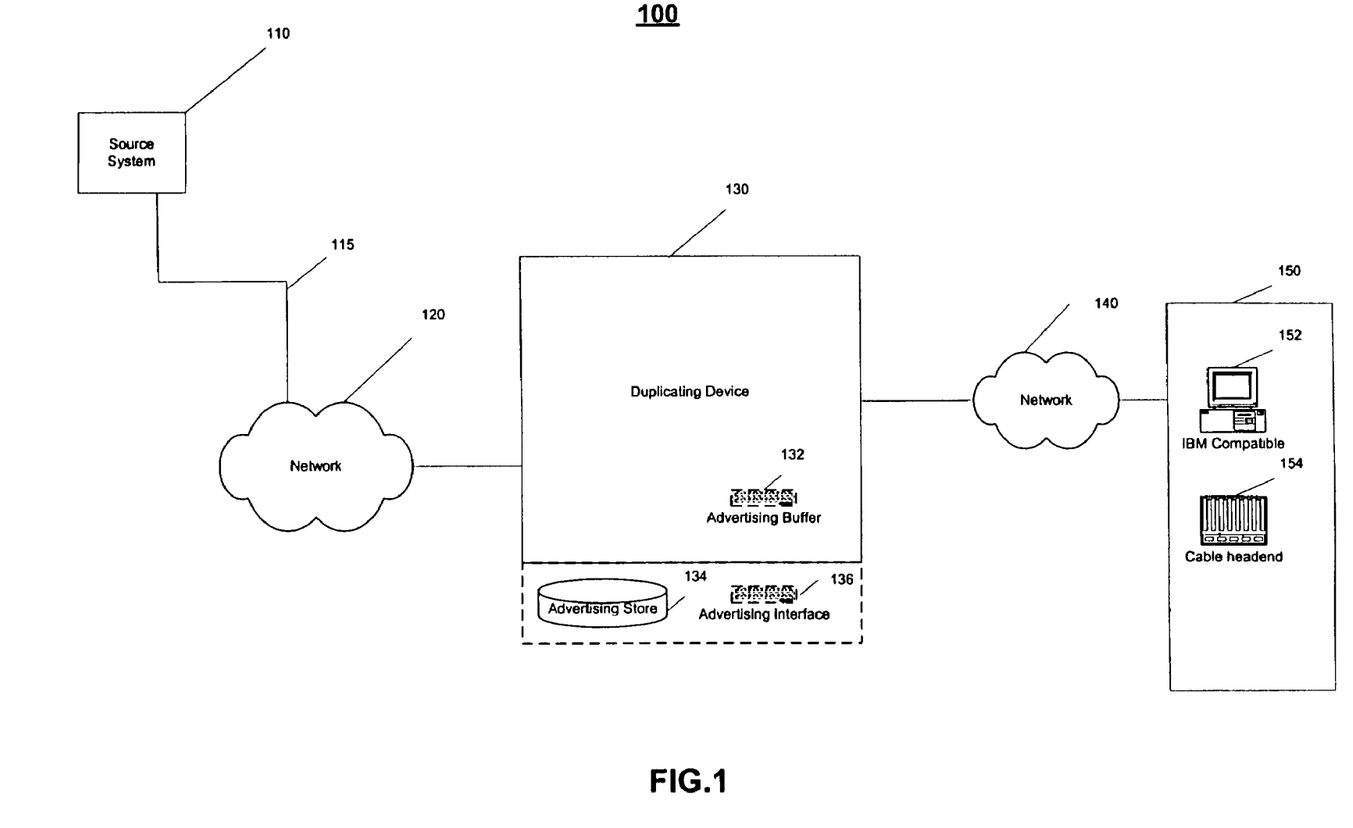
FIG. 1 is a block diagram of a communications system configured to splice multiple streams of data units.

Referring to FIG. 1, communications system 100 includes a source system 110, a terminal 150, and communication software and hardware enabling communications between the source system 110 and the terminal 150. More particularly, the communications path between the source system 110 and the terminal 150 includes a network 120, a duplicating device 130, and a network 140. As will be described in greater detail, the source system 110 generally transmits one or more data units in a first feed of data units across network 120 to one or more duplicating devices 130 that duplicate data units or portions thereof and transmit the duplicated data units or data unit portions to two or more terminals 150 through network 140.

Typically, a source system 110 may be structured and arranged to convert a media source (e.g., a video or audio feed) into a first feed of data units for transmission across a network 120. The source system 110 may include a general-purpose computer having a central processor unit (CPU), and memory/storage devices that store data and various programs such as an operating system and one or more application programs. Other examples of a source system 110 include a workstation, a server, a special purpose device or component, a broadcast system, other equipment, or some combination thereof capable of responding to and executing instructions in a defined manner. The source system 110 also typically includes an input/output (I/O) device (e.g., video and audio input and conversion capability), and peripheral equipment such as a communications card or device (e.g., a modem or a network adapter) for exchanging data with the network 120.

A communications link 115 is used to communicate data between source system 110 and network 120. Communications link 115 may include, for example, a telephone line, a wireless network link, a cable network, or a direct connection.

The network 120 typically includes hardware and/or software capable of enabling direct or indirect communications between the source system 110 and the duplicating device 130. The network 120 may include a direct link between the source system 110 and the device 130, or it may include one or networks or subnetworks between them (not explicitly shown). Each network or subnetwork may include, for example, a wired or wireless data pathway capable of carrying and receiving data. Examples of network 120 include the Internet, the World Wide Web, a WAN ("Wide Area Network"), a LAN ("Local Area Network"), an analog or a digital wired and/or wireless telephone network (e.g., PSTN ("Public Switched Telephone Network"), ISDN ("Integrated Services Digital Network"), or xDSL ("any form of Digital Subscriber Loop")), a radio, television, cable, or satellite network, or any other delivery mechanism for carrying data.

The duplicating device 130 typically is structured and arranged to receive the first feed of data units from the source system 110, to duplicate the stream of data units, and to transmit a stream of duplicated data units to one or more terminals 150. In some implementations, the duplicating device 130 is structured and arranged to perform filtering and forwarding between different domains at the same level of the protocol stack in the OSI ("Open System Interconnection") reference model. For example, duplicating device 130 may forward Ethernet frames between different Ethernet segments. In another example, duplicating device 130 may forward IP packets between different IP subnets.

The duplicating device 130 may include a duplicating switch. Generally, a duplicating switch includes a device that performs network operations and functions in hardware (e.g., in a chip or part of chip). In some implementations, the duplicating switch may include an ASIC ("Application Specific Integrated Circuit") implementing network operations logic directly on a chip (e.g., logical gates fabricated on a silicon wafer and then manufactured into a chip). For example, an ASIC chip may perform filtering by receiving a packet, examining the IP address of the received packet, and filtering based on the IP address by implementing a logical gate structure in silicon.

Implementations of the device included in the duplicating switch may employ a Field Programmable Gate Array (FPGA). A FPGA is generally defined as including a chip or chips fabricated to allow a third party designer to implement a variety of logical designs on the chip. For example, a third party designer may load a FPGA with a design to replace the received IP addresses with different IP addresses, or may load the FPGA with a design to segment and reassemble IP packets as they are modified while being transmitted through different networks.

Implementations of the device included in the duplicating switch also may employ a network processor. A network processor is generally defined to include a chip or chips that allow software to specify which network operations will be performed. A network processor may perform a variety of operations. One example of a network processor may include several interconnected RISC ("Reduced Instruction Set Computer") processors fabricated in a network processor chip. The network processor chip may implement software to change an IP address of an IP packet on some of the RISC processors. Other RISC processors in the network processor may implement software that monitors which terminals are receiving an IP stream.

Although various examples of network operations were defined with respect to the different devices, each of the devices tends to be programmable and capable of performing the operations of the other devices. For example, the FPGA device is described as the device used to replace IP addresses and segment and reassemble packets. However, a network processor and ASIC are generally capable of performing the same operations.

The duplicating device 130 may include an advertising buffer 132 structured and arranged to store one or more pieces of advertising content. Typically, the advertising buffer 132 is structured and arranged to enable timely insertion of one or more pieces of advertising content into a duplicated feed. Although common uses of the advertising buffer 132 may include traditional advertisements, other content that may be stored in the advertising buffer may include National Emergency Broadcast System content, other programming (e.g., local and/or breaking news over nationally scheduled programming), and/or fail over connections.

The duplicating device 130 may include an advertising store 134 structured and arranged to store one or more pieces of content for insertion. As shown by the dotted lines, the advertising store 134 may reside locally on the duplicating device 130 or it may reside on a separate and distinct device, such as, for example, a separate server or duplicating switch with storage. Although aspects of the advertising store 134 may resemble aspects of the advertising buffer 132, the advertising buffer 132 serves to provide timely access to the desired content while the advertising store 134 serves to provide more storage than typically is practical for the advertising buffer 132 to provide.

In one example, a duplicating device 130 may include both an advertising buffer 132 and an advertising store 134. In this example, the pool of available advertisements might reside in the advertising store 134 with the duplicating device 130 selecting required advertisements for loading to the advertising buffer 132 for just-in time splicing. Through this selective loading to the advertising buffer 132, the amount of buffer required may be reduced. However, while the advertising buffer 132 may illustrate one device to reduce solid-state memory requirements, the advertising store 134 also may be used to splice advertisements. For example, the duplicating device 130 may initially store a received feed onto a hard disk drive. Advertising content may be inserted into the received feed, and the results may be transmitted as the duplicated feed. Other examples may feature the use of a disk drive with adequate seek times as an advertising buffer 132. Similarly, the advertising store 134 also may include one or more solid-state memory devices (e.g., Random Access Memory).

The duplicating device 130 also may include an advertising interface 136. Typically, the advertising interface 136 includes a controller structured and arranged to access one or more pieces of advertising content for insertion into the duplicated feed. For example, the advertising interface 136 may access a network (e.g., network 120 or 140) to 'pull' the required advertisement so that the required advertisement may be inserted. The advertising interface 136 then may load the pulled advertisement to the advertising buffer 132 and/or advertising store 134.

Data units handled by duplicating switch 130 may be accessed by or sent to terminals 150 through network 140. As such, network 140 is structured and arranged to receive data units transmitted from the duplicating switch 130 for transmission to the terminals 150.

The network 140 may include hardware and/or software capable of enabling direct or indirect communications between the duplicating switch 130 and the terminal 150. As such, the network 140 may include a direct link between the duplicating switch 130 and the terminal 150, or it may include one or more networks or subnetworks between them (not shown). Each network or subnetwork may include, for example, a wired or wireless data pathway capable of carrying and receiving data. Examples of the delivery network include the examples noted above with respect to network 120. Network 120 and network 140 may share one or more hardware or software devices.

The terminal 150 may include one or more devices capable of receiving the duplicated feed transmitted by duplicating device 130 through network 140. The terminal 150 may include a controller (not shown) that processes instructions received from or generated by a software application, a program, a piece of code, a device, a computer, a computer system, or a combination thereof, which independently or collectively direct operations of the terminal 150. The instructions may be embodied permanently or temporarily in any type of machine, component, equipment, storage medium, or propagated signal that is capable of being delivered to the terminal 150 or that may reside with the controller at terminal 150. Terminal 150 may include a general-purpose computer (e.g., a personal computer (PC) 152) capable of responding to and executing instructions in a defined manner. The terminal 150 also may include a workstation, a notebook computer, a PDA ("Personal Digital Assistant"), a wireless phone, a component, other equipment, or some combination of these items that is capable of responding to and executing instructions.

In one implementation, the terminal 150 includes one or more information retrieval software applications (e.g., a browser, a mail application, an instant messaging client, an Internet service provider client, or an AOL TV or other integrated client) capable of receiving one or more data units. The information retrieval applications may run on a general-purpose operating system and a hardware platform that includes a general-purpose processor and specialized hardware for graphics, communications and/or other capabilities. In another implementation, terminal 150 may include a wireless telephone running a micro-browser application on a reduced operating system with general purpose and specialized hardware capable of operating in mobile environments.

In another implementation, the terminal 150 may include a cable headend 154. Typically, aspects of the cable headend 154 resemble aspects of the terminal 150 and/or the PC 152 described above. For example, the cable headend 154 may include one or more software applications to retrieve content. Thus, a cable headend 154 may retrieve required content and sent it out on a cable distribution program as regularly scheduled programming on a specified cable channel.

However, aspects of the cable headend 154 typically differ in that the cable headend is typically structured and arranged to act as a proxy for one or more devices (e.g., a set top tuner). While a PC can act as a proxy for one or more devices, PC's typically do not do so. As a consequence, the state of the cable headend 154 may include an aggregation of one or more constituent subscribers, in addition to describing state information for the cable headend itself. For example, a cable headend 154 could be given a profile that aggregates one or more individual profiles. This aggregated profile could be modified, tracked, and changed in the same manner that the state of a PC could be modified, tracked and changed. The difference is that the cable headend 154 may involve additional processing to aggregate the individual profiles/states.

Figure 2:
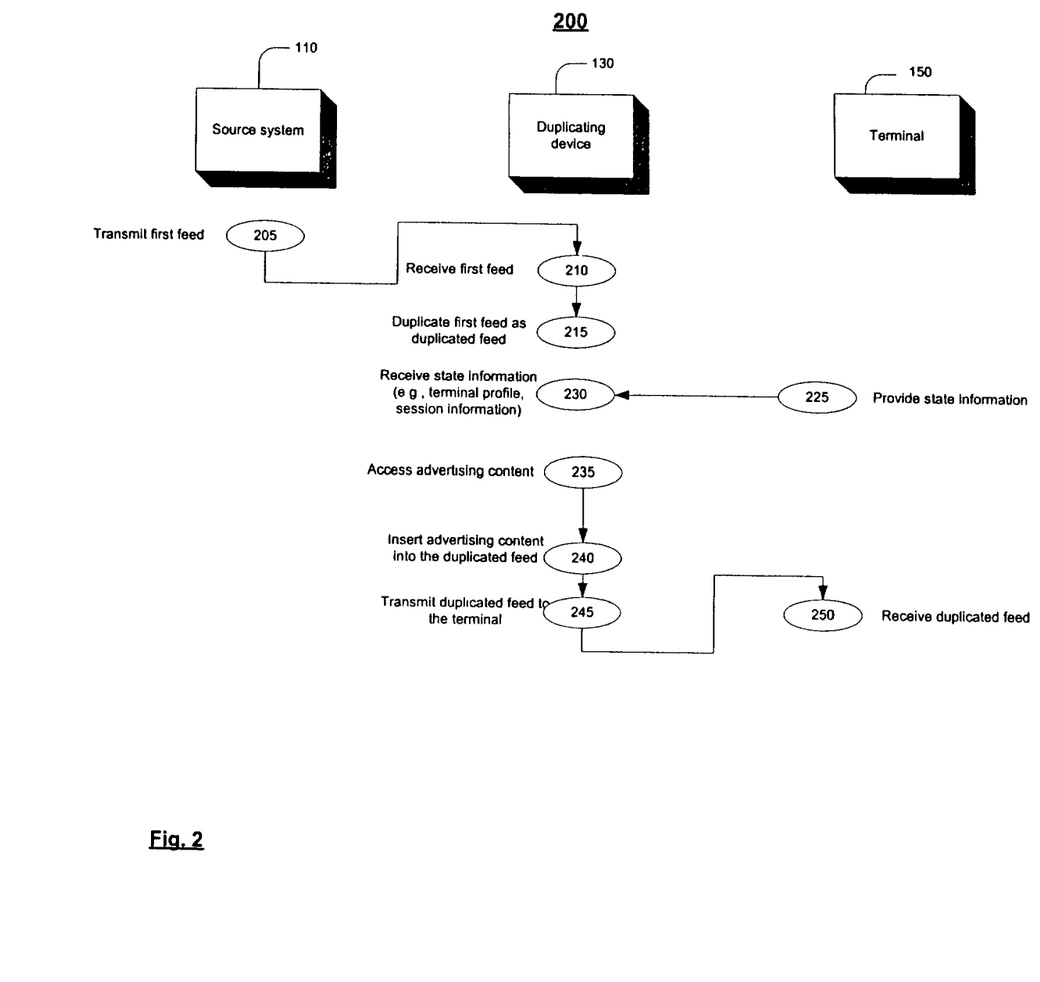
FIG. 2 is a flow chart illustrating how advertisements may be inserted into a duplicated feed in a communications system, such as the communications system in FIG. 1.

FIG. 2 illustrates how advertisements may be inserted in a communications system 100. Specifically, FIG. 2 illustrates how a duplicating device 130 receives a first feed, determines the state of a terminal, accessing advertising content responsive to the first feed and the state of the terminal, and transmits duplicated feed with the advertising content inserted into the duplicated feed.

Initially, the source system 100 transmits the first feed (step 205). Examples of the first feed (e.g., stream of data units) may include a video feed (e.g., television programming), an audio feed (e.g., Internet radio, or nationally syndicated radio programming being distributed across an IP network), and/or nontraditional media (e.g., an online chat). The duplicating device 130 receives the first feed (step 210), and duplicates the first feed (step 215). Although duplicating the first feed is shown as occurring in response to receiving the first stream, duplicating the first feed is not required to be performed first upon receiving the first feed. Furthermore, duplicating the first feed may refer to a broad spectrum of activities.

In one example, duplicating the first feed may refer to storing the first feed in a buffer. Storing this feed may enable rapid duplication of the content as a duplicated feed by adding and replacing new header information to enable simultaneous access to the content by multiple terminals. Another example may include storing the packet with address fields in the buffer. The address fields may be modified to represent the addresses corresponding to one or more terminals. Other implementations may receive the first feed, duplicate the feed, and transmit the feed to one or more terminals, without necessarily waiting for state information to be provided unless advertisements are required.

Independently, or in response to receipt of the first feed by the duplicating device 130, the terminal 150 provides state information (step 225) that the duplicating device 130 receives (step 230). The state information may include a terminal profile and session information. A terminal profile may describe one or more preferences associated with viewers using a terminal. For example, a viewer may prefer trucks to convertibles. Similarly, the viewer may dislike professional sports, while preferring collegiate athletics. Regardless of the particular preference, these preferences may be represented in an automated manner. In one example, the terminal may have a record with one or more associated fields, where each field describes the terminal viewer. For example, the first parameter may indicate gender, while the second parameter may indicate age. In a second example, a profile may include one or more keywords. In any event, aspects of this terminal profile may be used to select advertising content.

Session information describes the relationship between the terminal 150 and the duplicating device 130 relative to the duplicated recorded by the feed terminal 150. For example, the duplicating device 130 may know that a first terminal has processed 80 packets of the duplicated feed, while a second terminal has processed 95 packets of the duplicated feed. Accordingly, the second terminal will likely reach advertising points at an earlier time than the first terminal. Session information also may identify the duplicated feed being received by the terminal.

In response to the state information and receiving the first feed, the duplicating device 130 accesses advertising content (step 235). Typically, accessing content information includes correlating the state information (e.g., session and profile information) with the received first feed. For example, marketers may determine that certain food advertisements should be targeted to certain demographics after certain programming. Thus, upon determining that the targeted conditions will occur or are occurring, one such identified food advertisement may be accessed for incorporation into the duplicated feed. Accessing advertising content may describe a range of activities. For example, accessing advertising content may include loading three pieces of advertising content in a buffer (e.g., advertising buffer 132) from an advertising library (e.g., advertising store 134) of twenty pieces. In another example, the duplicating device 130 uses advertising interface 333 to retrieve the required advertisements from an off-device media library. The advertising interface 134 may access an advertising stream and retrieve the stream for incorporation into the duplicated feed of the duplicating device 130 without storing the advertising stream. In another example, accessing the advertising content may include determining whether the advertising content in the advertising buffer 132 meets acceptance criteria. If not, a selection program may identify advertising content that meets the criteria.

The duplicating device 130 inserts advertising content into the duplicated feed (step 240). Inserting advertising content into the duplicated feed may include modifying a location identifier (e.g., a pointer) that identifies which content to duplicate, for example, to change the identifier from pointing to the first feed (e.g., regularly scheduled programming) to pointing to advertising content loaded in the buffer. In another example, the advertising content may be inserted into buffer locations adjoining the first feed. That is, in the course of advancing the location identifier (indicating the portion of the duplicated feed to be sent to a terminal), the location identifier would make no distinction as to whether the content in the buffer was from the first feed or the advertising feed, and, instead, would advance through the content without regard to the classification. Another example may include creating at the end of the duplicated feed an indicator as to where the content from the first feed ends. Upon reaching the indicator, the duplicating device may access the stored content or advertising feed where the advertising content resides. The duplicating device 130 transmits the duplicated feed with the inserted advertising content to the terminal (step 245). The terminal 150 receives the duplicated feed (step 250). Receiving the duplicated feed may involve a handshaking process to coordinate flow control and stream reception. For example, the duplicating device 130 may transmit the stream as a TCP ("Transport Control Protocol") stream and use TCP's handshaking capability to minimize the likelihood of dropped data. This handshaking process may verify that a terminal has received the advertising content.

Figure 3:
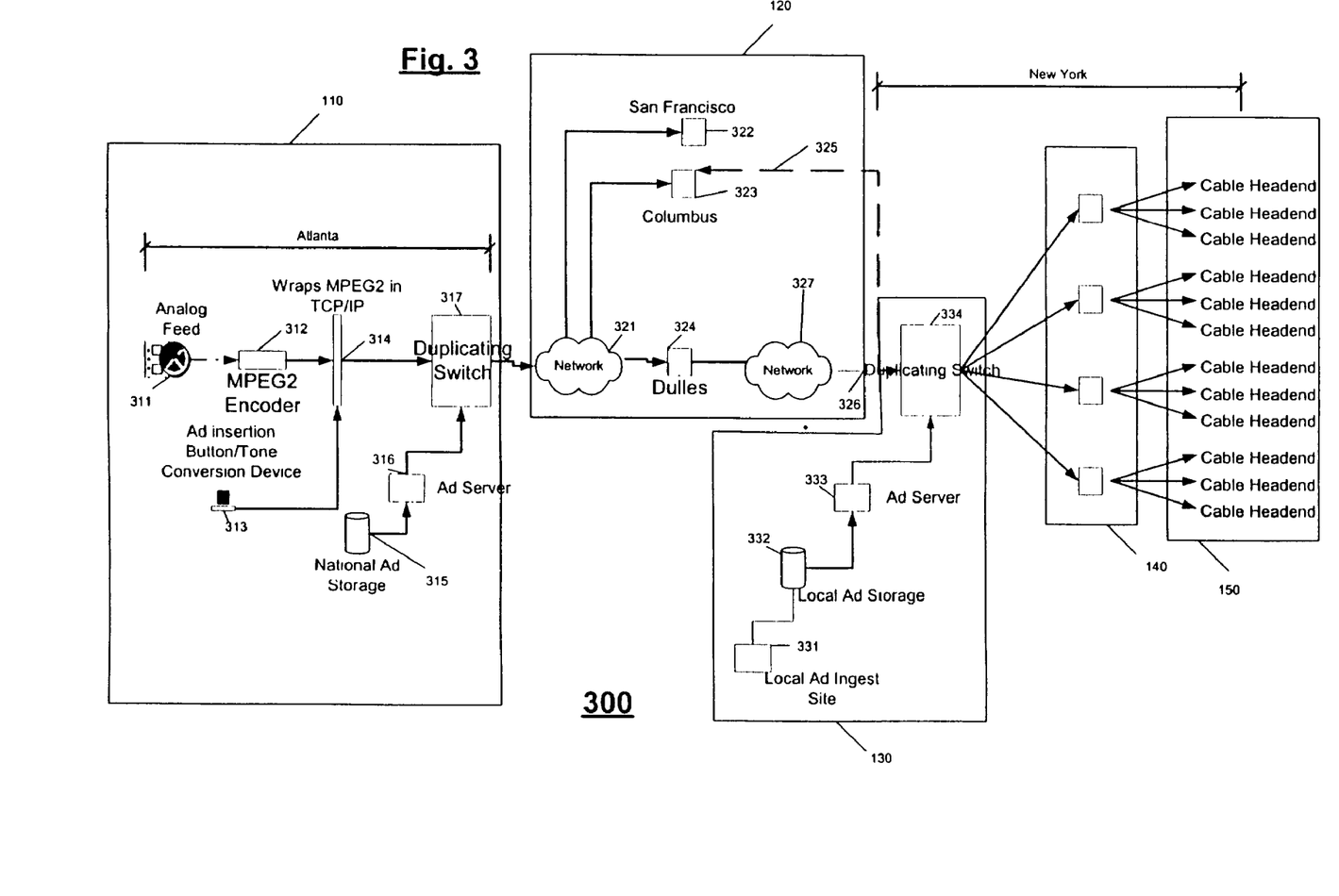
FIG. 3 is a block diagram of a communications system configured to enable national and local advertising insertion.

FIG. 3 illustrates an example of a communication system 300 that enables national and local advertising to be sent to one or more terminals. Generally, aspects of the system described with respect to FIG. 3 relate to aspects of the system described with respect to FIG. 1. For example, both system 100 and system 300 include a source system 110, a network 120, a duplicating device 130, a network 140, and a terminal 150. However, the system 300 typically is modified to address a two-tiered advertising system associated with national and local advertising. Thus, aspects of the system 300 also may present, though not shown, in the system 100. For example, the source system 110 may include an analog feed 311, though such a feed is only shown in FIG. 3.

Source system 110 typically includes a device structured and arranged to send out a 'national' feed through network 120 to one or more duplicating devices 130 acting as local content insertion points. Generally, source system 110 includes an analog feed 311, an MPEG2 (Motion Picture Experts Group 2) encoder 312, an advertising insertion device 313, a conversion device 314, a national advertising storage 315, an advertising server 316, and a duplicating switch 317. The source system 110 may be structured and arranged to convert the analog feed 311 into MPEG2 feed using the MPEG2 encoder 312. The conversion device 314 is structured and arranged to wrap the MPEG2 stream into an IP stream with advertising insertion points using advertising insertion device 313. Duplicating device 317 is structured and arranged to access national advertising storage 315 through advertising server 316 to insert advertising content into the EP stream sent from conversion device 314. Thus, aspects of the source system in FIG. 3 may resemble aspects of the duplicating device described previously. However, FIG. 3, duplicating switch 317 interfaces with another duplicating device 130 instead of interfacing with a terminal 150.

Although FIG. 3 illustrates a two-tiered system of advertising insertion, implementations may include using more than two tiers of duplicating devices. For example, a carrier may include international, national, regional, and local tiers. The duplicating devices need not even be assigned to hierarchies. For example, a duplicating device closet to the feed may be accessed as the first device for inserting adverting content. This first device may send one or more streams to a second tier of duplicating devices. These second tier devices may send their feeds with additional inserted advertising content to a third tier of duplicating devices. The situation of the tiers need not be logical or geographical. For example, the second and third tiers may represent different distributor and subscriber groups.

Network 120 includes several connections from the source system 110 to the duplicating device 130. For example, network 321 includes links to San Francisco 322, Columbus 323, and Dulles 324. These connection to different locations may include redundant links to duplicating device. For example, there is a redundant link 325 between a Columbus link 323 and a Dulles link 326 (through network 327) to reach duplicating device 130.

Duplicating device 130 includes one or more devices structured and arranged to insert local advertising content. Duplicating device 130 includes a local advertising ingest site 331, a local advertising storage device 332, and advertising server 333, and a duplicating switch 334. In general, duplicating device 130 receives local advertising content in a local advertising content ingest site 331. For example, the local advertising ingest device 331 may include a device that converts one or more tapes of advertisements into a MPEG2 file. This advertising content may reside on local advertising storage 332 to be accessed by an advertising server 333. The duplicating switch 334 may access the advertising server 333 to access local advertisements.

Although the duplicating device 130 is described with respect to having the local advertising ingest device 331 feed into the local advertising storage 332, having the local advertising server 332 feed into the advertising server 333, and having the advertising 333 feed into the duplicating switch 334, other implementations need not include all of these devices. Rather, these devices illustrate the functionality that may be present at a local advertising content insertion site. For example, the duplicating device 130 might only include a duplicating switch 334. This duplicating switch 334 may include functionality to receive advertising content from one or more sources. These sources may include an analog conversion interface blade on the duplicating switch 334, storage residing on the duplicating switch, and/or a networked controller configured to retrieve advertisements.

The duplicating device 130 may interface with the network 140 to reach the terminal 150, which in this case is the cable headend. Because of the functionality of the cable headend equipment, aspects of the network 140 may be indistinguishable from aspects of the terminal 150. For example, network 140 may include the network equipment to connect the duplicating device 130 to a cable headend, with the cable terminating a portion of the communications (e.g., to modulate onto channels for tuners) with a portion of the communications being forwarded as Internet traffic over the cable system to consumers. Irrespective of which devices are labeled as the network or the terminals, the duplicating device transmits the duplicated feed in response to the state of the terminal, which may be a cable headend or a PC behind the cable headend accessing the Internet.

Figure 4:
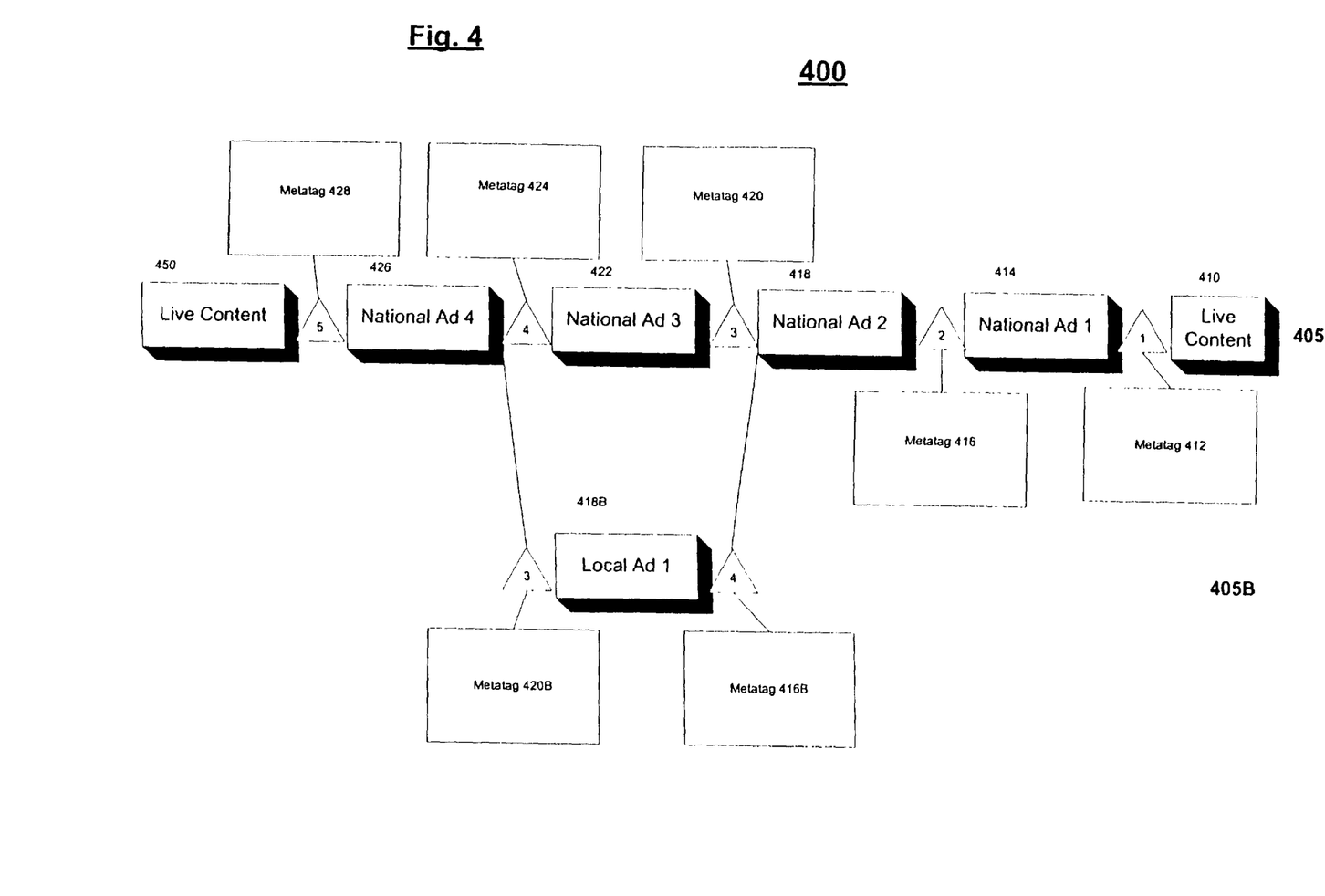
FIG. 4 is a block diagram showing data flow as a duplicating device uses metatags to enable local advertising insertion.

FIG. 4 illustrates how metatags may be used to indicate when advertising content may be inserted in a stream of data units, and whether to insert a local advertisement over national advertising. In general, metatags are placed (logically or temporally) between two pieces of content in a feed to indicate the end of a first piece of content and the beginning of a second piece of content.

Metatags may be created in a number of ways. For example, metatags may be inserted between content items in a playlist of content. In another example, metatags may be created through a video-editing suite.

Timeline 400 includes a first feed 405, which may include live or scheduled programming, advertisements, national programs, and/or transmissions of the Emergency Broadcast System. In particular, FIG. 4 shows a timeline 400 of content being transmitted in a stream of datagrams. In timeline 400, the timeline begins at the right and moves to the left (e.g., beginning with live content 410 and ending with live content 450). In timeline 400, first feed 405 includes live content 410, which is followed by national advertisements 414, 418, 422, 426, and then live content 450. Live content 410 and national advertisement 414 are separated by a metatag 412, national advertisement 414 and 418 are separated by a metatag 416, national advertisements 418 and 422 are separated by metatag 420, national advertisements 422 and 426 are separated by metatag 424, and national advertisement 426 and live content 450 are separated by metatag 428.

Timeline 400 also shows local advertising content in a feed. Advertising content 405 begins with metatag 416B, followed by local advertisement 418B, which is in turn followed by metatag 420B.

The metatag includes a weight indicating a prioritization for the affiliated piece of content. For example, when national advertisement 414 is affiliated with metatag 412, metatag 412 has a weight of one. In timeline 400, advertisements with a higher priority will be incorporated into a duplicated feed over advertisements with a lower priority. Thus, in the example shown, priority five represents the highest priority and advertisements having this priority will be inserted over all other pieces of content with a priority of less than one. In this case, there is a no local advertising content so the national advertisement 414 is inserted. However, the metatag 420 associated with national advertisement 422 has a weight of 3 while the metatag 416B for local advertisement 418B has a weight of 4. Thus, local advertisement 418B would be inserted in the duplicated feed over national advertisement 422. After local advertisement 418B, local metatag 420B has a weight of 3 while the metatag 424 associated with national advertisement 426 has a weight of 4 indicating that the duplicated feed uses national advertisement 426 over the local advertising content.

In the event of a tie between two metatags, various tiebreaker decisions may be used (e.g., default to local advertising content). The metatag may be descriptive of the intended audience or of the advertising content that was ordered. For example, a weight of 6 may indicate that the metatag was intended for 6 million terminals. Thus, the available weight of metatags may be allocated to ensure that the associated advertising content reaches the required number of terminals. In another example, the weight may indicate the revenue available by inserting the advertising feed. For example, a weight of 3 may indicate 3×(base unit of revenue) to determine revenue that would be received by inserting the advertising content In this manner, the operator of a local network may determine which advertisements should be placed to maximize operator revenue.

Figure 5:
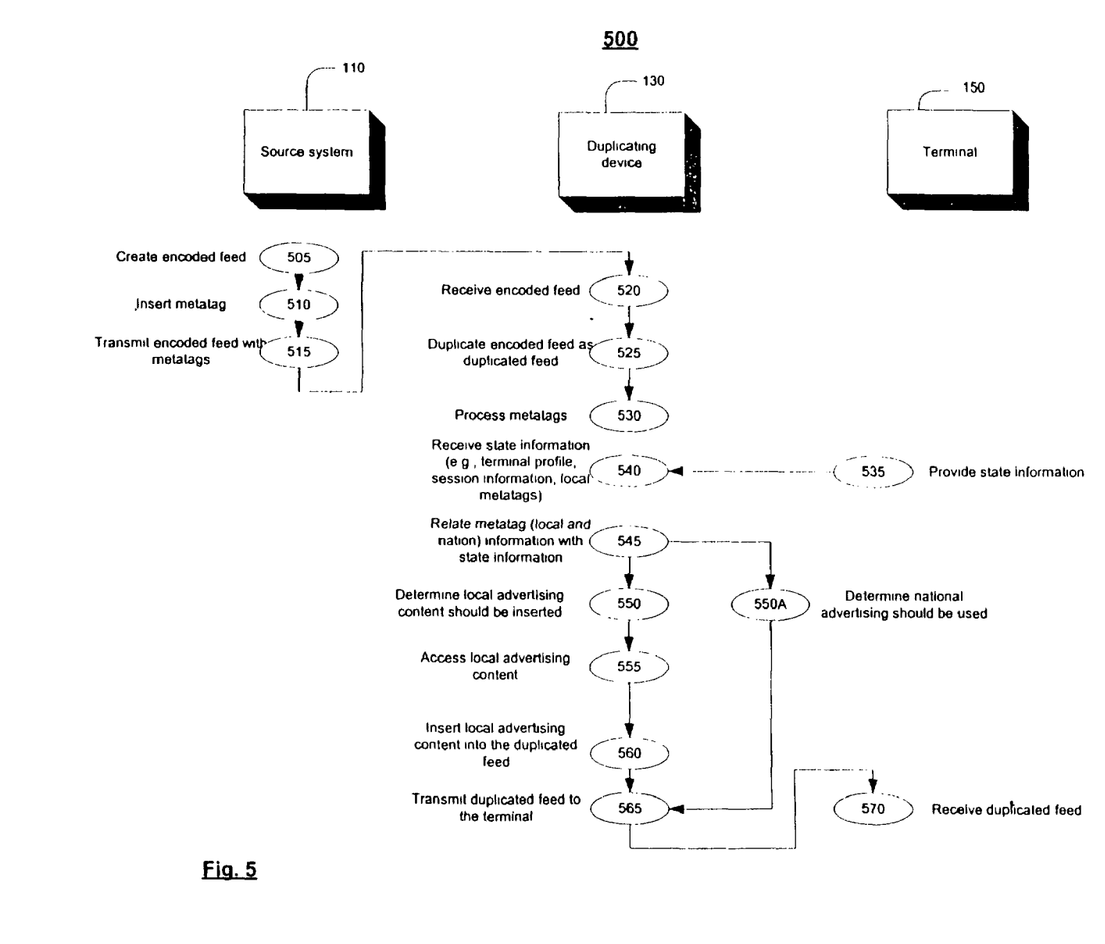
FIG. 5 is a flow chart illustrating how a communications system may insert local advertising content by processing metatags.

FIG. 5 provides a flow chart 500 that shows how metatags may be used to insert advertising content. In general, aspects of FIG. 5 relate to FIG. 2 and illustrate how advertising content may be inserted. However, FIG. 5 illustrates how a metatag associated with an advertising indicator may be used to select content. Initially, the source system 110 creates an encoded feed (step 505). The source system 110 inserts a metatag (step 510). Typically, inserting a metatag includes creating a digital mark in an encoded feed of data units so that a duplicating device knows to insert advertisements. Typically, each metatag includes one or more descriptors of the metatag. For example, as was described with respect to FIG. 4, the metatag may include a weight that indicates the priority of the subsequent content (e.g., a national advertisement) relative to content that might be inserted downstream. Inserting the metatag may involve inserting advertising content, as was described with respect to FIG. 2. In another example, the metatag may be inserted without associated advertising content. If background content is available (e.g., national advertising content what was not selected for insertion into the duplicated feed), then, in the event of an outage, the duplicating device may resort to the background content for incorporation into the duplicated feed. In yet another example, the metatag may include a record descriptive of the advertisement to identify targeted groups. The record also may be indicative of the advertisement. The source system 110 transmits the encoded stream with the metatag (step 515). If TCP is used to transmit the encoded feed, then the delivery and receipt of the encoded stream and metatags may be verified. TCP is not the only protocol that may verify the delivery and receipt of the encoded feed. Rather, TCP is one example of a protocol that verifies receipt of content, and does so inherently through acknowledgements. Other protocols also may verify delivery and receipt.

The source system 130 receives the encoded feed (step 520). The duplicating device 130 then duplicates the encoded feed as a duplicated feed (step 525).

The duplicating device 130 processes the metatags (step 530). Generally, processing the metatags involves determining a value for one or more descriptors of the metatag and/or associated content. For example, as described with respect to FIG. 4, processing the metatag may include determining that the weight of the encoded metatag is 5.

The terminal provides state information to the duplicating device (step 535), which then receives the state information (step 540). The state information may include local metatag information for local advertising content to be inserted. For example, a local advertisement may include a metatag weight of 5.

Although receiving state information is shown with respect to the terminal 150, the state information may be received from other systems. For example, the metatag information for local advertising content may be received when the local advertising content is loaded (e.g., at the local advertising ingest site).

The duplicating device 130 relates the metatag information with the state information (step 545) to determine if local advertising content should be selected (step 550). Relating the metatag information may include determining whether the national advertising content in the encoded feed takes priority over the local advertising content. Alternatively, the metatag information may be applied to the state information to create a profile of advertising content that should be retrieved. The advertising content may be identified on a granular basis, that is, per terminal. For example, applying the metatag to state information for a first terminal may indicate that the national advertising content should be inserted, while applying the metatag to state information for a second terminal may indicate that local advertising content should be inserted. In one example, the inserted local advertising content may be selected from a queue of advertising content. In another example, local advertising content may be selected from a collection of local advertising content, with the selection being random or based on characteristics of, for example, the terminal or the local advertising content.

If local advertising content is selected, the local advertising content is accessed (step 550) and inserted into the duplicated feed (step 560). If the local advertising content is not inserted, the national advertising content is used (step 550A). In any event, the duplicating device transmits the duplicated feed to the terminal (step 565). The terminal 150 receives the duplicated feed (step 570).

Other implementations are within the scope of the following claims. For instance, a stream manager may dynamically create and remove advertising content from libraries. The stream manager may include a network operator, a managing server, a workstation, or a scheduling agent. Examples of the duplicating device include a server and a duplicating switch. While aspects of the duplicating device are described with respect to inserting advertising content, the duplicating device may be used to insert non-advertising content into a duplicated feed.

The buffer in the duplicating device may be set to a length such that, when a terminal receives the duplicated feed, the content will be outputted alongside live content through other transmissions channels. For example, the buffer length may be set to 500 ms ("milliseconds") to mimic the delay present in satellite transmissions. A 500 ms buffer enables lost data units to be retransmitted, assuming 150 ms nationwide response rates. Similarly, a 500 ms buffer enables live or emergency transmissions to e received nearly simultaneously with transmissions being sent over the airwaves as radio (e.g., Frequency modulation (FM) radio).

What is claimed is:

1. A method of inserting advertising content in a feed, the method comprising:
   receiving, from a source system, a content feed that includes:
      a selection of programming with one or more segments, and
      an advertising insertion indication between a first segment in the selection of programming and a second segment in the selection of programming;
   enabling duplication, at a duplicating device, of the content feed for transmission to each of multiple terminals, including:
      transmitting, in a duplicated stream of Internet Protocol packets to each of the multiple terminals, the first segment in the selection of programming,
      detecting, based on state information from a first terminal of the multiple terminals, an indication that the first terminal has received some but not all of the data packets of the first segment in the selection of programming,
      triggering insertion, based on the state information, of advertising content into the duplicated stream transmitted to the first terminal,
      transmitting, in the duplicated stream to the first terminal, the advertising content, and
      transmitting, in the duplicated stream to each of the multiple terminals, the second segment in the selection of programming.

2. The method of claim 1 wherein the advertising content is selected based on a profile for the terminal.

3. The method of claim 2 further comprising loading the advertising content upon determining that the terminal profile relates to an advertising content profile associated with the advertising content.

4. The method of claim 3 wherein the first terminal profile relates to one or more preferences associated with a user of the terminal.

5. The method of claim 1 wherein the content feed includes programming scheduled for transmission at specific times.

6. The method of claim 1 wherein the advertising content is associated with one or more categories.

7. The method of claim 6 wherein the categories include a requirement specific to a geographic region.

8. The method of claim 1 wherein the advertising insertion indication includes a metatag.

9. The method of claim 8 wherein the metatag indicates a level of parental control.

10. The method of claim 1 wherein the advertising content is stored prior to inserting the advertising content.

11. The method of claim 10 wherein storing the advertising content includes storing the advertising content in an advertising buffer structured and arranged to be transmitted in the duplicated stream upon the occurrence of a predetermined event.

12. The method of claim 11 wherein the predetermined event comprises reaching a metatag in the content feed, the metatag indicating that the advertising content should be inserted in the duplicated stream.

13. The method of claim 1 wherein inserting advertising content includes comparing a metatag specific to a geographic region with a national metatag to determine whether to insert a piece of advertising content specific to a geographic region instead of a piece of national advertising content.

14. The method of claim 1 further comprising inserting content from the content feed in the event of an interruption.

15. The method of claim 14 wherein the interruption comprises a loss of service in accessing the advertising content.

16. The method of claim 14 wherein the interruption comprises receiving an emergency message indicating that emergency programming requires transmission.

17. The method of claim 1 wherein transmitting the duplicated stream to the first terminal includes transmitting the duplicated stream with an address corresponding to the first terminal.

18. The method of claim 1 further comprising determining, based on the state information, that a duplicated stream corresponding to a first terminal has reached an advertising insertion indication.

19. A advertising insertion device comprising:
a first communications interface structured and arranged to receive, from a source system, a content feed that includes:
  a selection of programming with one or more segments, and
  an advertising insertion indication between a first segment in the selection of programming and a second segment in the selection of programming;
a duplicating device that duplicates the content feed for transmission to each of multiple terminals;
an advertising processor structured and arranged to:
  transmit, in a duplicated stream of Internet Protocol packets to each of the multiple terminals, the first segment in the selection of programming,
  detect state information from a first terminal of the multiple terminals via the internet, wherein the state information indicates that some but not all of the Internet Protocol packets of the first segment in the segment of programming have been received by the first terminal, and
  trigger insertion, based on the state information, of advertising content into the duplicated stream transmitted to the first terminal; and
a second communications interface structured and arranged to:
  transmit, in the duplicated stream to the first terminal, the advertising content, and
  transmit, in the duplicated stream to each of the multiple terminals, the second segment in the selection of programming.

20. The device of claim 19 wherein the advertising content is selected based on a profile for the first terminal.

21. The device of claim 20 further comprising a retrieval processor structured and arranged to load the advertising content upon determining that the first terminal profile relates to an advertising content profile associated with the advertising content.

22. The device of claim 21 wherein the first terminal profile relates to one or more preferences associated with a user of the terminal.

23. The device of claim 19 wherein the advertising insertion indication includes a metatag.

24. The device of claim 23 wherein the metatag indicates a level of parental control.

25. The device of claim 19 wherein the advertising processor is structured and arranged to store the advertising content prior to inserting the advertising content.

26. The device of claim 25 wherein the device includes an advertising buffer structured and arranged to store the advertising content for transmission in the duplicated stream upon the occurrence of a predetermined event.

27. The device of claim 26 wherein the predetermined event comprises reaching a metatag in the content feed, the metatag indicating that the advertising content should be inserted in the duplicated stream.

28. The device of claim 19 further comprising an interruption processor structured and arranged to insert content from the content feed in the event of an interruption.

29. The device of claim 28 wherein the interruption comprises a loss of service in accessing the advertising content.

30. The device of claim 28 wherein the interruption comprises receiving an emergency message indicating that emergency programming requires transmission.

31. The advertising device of claim 19, wherein the advertising processor is instructed and arranged to determine, based on the state information, that a duplicated stream corresponding to a first terminal has reached an advertising insertion indication.

32. An advertising insertion program on a non-transitory storage medium comprising:
a first communications code segment structured and arranged to receive, from a source system, a content feed that includes:
  a selection of programming with one or more segments, and
  an advertising insertion indication between a first segment in the selection of programming and a second segment in the selection of programming;
a duplication code segment structured and arranged to enable duplication, at a duplicating device, of the content feed for transmission to each of multiple terminals;
an insertion code segment structured and arranged to:
  transmit, in a duplicated stream of Internet Protocol packets to each of the multiple terminals, the first segment in the selection of programming,
  detect state information from a first terminal of the multiple terminals via the Internet, wherein the state information indicates some but not all of the Internet Protocol packets from the first segment in the selection of programming have been received by the first terminal, and
  trigger insertion, based on the state information, of advertising content into the duplicated stream transmitted to the first terminal; and
a second communications interface structured and arranged to:
  transmit, in the duplicated stream to the first terminal, the advertising content, and
  transmit, in the duplicated stream to each of the multiple terminals, the second segment in the selection of programming.

33. The program of claim 32 wherein the advertising content is selected based on a profile for the terminal.

34. The program of claim 33 further comprising a retrieval code segment structured and arranged to load the advertising content upon determining that the terminal profile relates to an advertising content profile associated with the advertising content.

35. The program of claim 34 wherein the first terminal profile relates to one or more preferences associated with a user of the first terminal.

36. The advertising insertion program of claim 32, wherein the insertion code segment is structured and arranged to determine, based on the state information, that a duplicated stream corresponding to a first terminal has reached an advertising insertion indication.

37. An advertising insertion program on a non-transitory storage medium comprising:
means for receiving, from a source system, a content feed that includes:
a selection of programming with one or more segments, and
an advertising insertion indication between a first segment in the selection of programming and a second segment in the selection of programming; and
means for enabling duplication, at a duplicating device, of the content feed for transmission to each of multiple terminals, including:
means for transmitting, in a duplicated stream of Internet Protocol packets to each of the multiple terminal, the first segment in the selection of programming,
means for detecting state information, from a first terminal of the multiple terminals, wherein the state information indicates that some but not all of the Internet Protocol packets of the first segment in the selection of programming have been received by the first terminal;
means for triggering insertion, base on the state information, of advertising content into the duplicated stream transmitted to the first terminal,
means for transmitting, in the duplicated stream to the first terminal, the advertising content, and
means for transmitting, in the duplicated stream to each of the multiple terminals, the second segment in the selection of programming.

38. The advertising insertion program of claim 37, further comprising means for determining, based on the state information, that a duplicated stream associated with a first terminal has reached an advertising insertion indication.

* * * * *

UNITED STATES PATENT AND TRADEMARK OFFICE
CERTIFICATE OF CORRECTION

| | |
|---|---|
| PATENT NO. | : 8,028,092 B2 |
| APPLICATION NO. | : 10/183420 |
| DATED | : September 27, 2011 |
| INVENTOR(S) | : Scott K. Brown et al. |

It is certified that error appears in the above-identified patent and that said Letters Patent is hereby corrected as shown below:

Claim 19, col. 13, line 49, "internet" should read -- Internet --.

Claim 31, col. 14, line 31, "processor is instructed and arranged" should read -- processor is structured and arranged --.

Claim 33, col. 15, line 2, "profile for the terminal." should read -- profile for the first terminal. --.

Claim 34, col. 15, line 5, "the terminal profile" should read -- the first terminal profile --.

Signed and Sealed this
Tenth Day of January, 2012

David J. Kappos
*Director of the United States Patent and Trademark Office*